United States Patent [19]

Smith

[11] Patent Number: 5,999,488

[45] Date of Patent: Dec. 7, 1999

[54] METHOD AND APPARATUS FOR MIGRATION BY FINITE DIFFERENCES

[75] Inventor: Brackin A. Smith, Bartlesville, Okla.

[73] Assignee: Phillips Petroleum Company, Bartlesville, Okla.

[21] Appl. No.: 09/067,650

[22] Filed: Apr. 27, 1998

[51] Int. Cl.$^6$ ................................................. G01V 1/28
[52] U.S. Cl. ............................... 367/50; 367/51; 367/52; 367/53; 364/421
[58] Field of Search ............................... 367/151, 73, 49, 367/68, 50, 129, 53, 51, 52; 340/15; 364/421

[56] References Cited

U.S. PATENT DOCUMENTS

| | | | |
|---|---|---|---|
| 4,056,803 | 11/1977 | White et al. | 340/15 |
| 4,464,737 | 8/1984 | Pann | 367/49 |
| 4,745,585 | 5/1988 | Larner | 367/50 |
| 4,888,742 | 12/1989 | Beasley | 367/53 |
| 4,943,950 | 7/1990 | Beasley et al. | 367/50 |
| 4,953,130 | 8/1990 | Dablin | 367/73 |
| 4,953,140 | 8/1990 | Dablin | 367/73 |
| 5,394,325 | 2/1995 | Schneider et al. | 364/421 |
| 5,500,832 | 3/1996 | Berryhill | 367/151 |
| 5,528,557 | 6/1996 | Horn | 367/129 |
| 5,530,679 | 6/1996 | Albertin | 367/68 |

OTHER PUBLICATIONS

Mufti, I.R. et al, Geophysics, vol. 61, No. 3, pp. 776–794 "Finite–Difference Depth Migation of Exploration–Scale Seismic Data" Discloses wave equation computations using numerical techniques for reverse time migration.

Mufti, I.R., et al., Geophysics, vol. 6, No. 3. pp. 776–794 "Finite–Difference Depth Migration of Exploration–Scale Seismic Data", Jun. 1996.

Ristow, D. et al., Journal Seismic Exploration vol. 6, No. 4, pp. 367–383, Optimized Operations for 3–d Fourier Finite–Difference Migration, Oct. 1997.

M. C. Tanis et al., 67th Annual SEG INT MTG Expanded Abstracts Biographies vol. 2, pp. 1422–1425, Finite Difference Migration of 3–D Seismic Data with Parallel Alogarithm, Nov. 1997.

I. Cockshott et al., 66th Annual SEG Intl' Meeting Expanded Abstracts Biogr vol. 1, pp. 435–438, 3–D Migration Using the Fourier Finite–Difference Method, Nov. 1996.

T. Ruehl, Geophysics vol. 61, No. 5, pp. 1394–1399, Finite–Difference Migration Derived from the Kirchhoff–Helmholtz Integral, Sep. 1996.

J. E. Gaiser, 64th Annual SEG Int'l Meeting Expanded Tech Program Abstract Boigraphies pp. 1274–1277, Effective use of the Laplacian Transformation for Explicit Finite–Deifference 3–D Migration, Oct. 1994.

D. Ristow et al., "Fourier Finite–Difference Migration", Geophysics vol. 59, No. 12, pp. 1882–1893, Dec. 1994.

L.E. Berg, 54th EAEG Meeting Technical Program and Paper Abstract pp. 228–229, "Steep Dip Migration by Replacing Vertical with Horizontal Propagation", Jun. 1992.

Z. Li, US DOE Report NO DOE/ER/14079–4, Compensating Finite–Difference Errors in 3–D Migration and Modeling, Oct. 1992.

S. A. Levin, 56th Annual Society of Exploration Geiophysicists Int'l Meeting Paper No. s77, Geophysics v. 52, No. 3, p421, Parallell Finite–Difference Migration, Mar. 1987.

P. Hood, Geophysics Prospecting v 26, No. 4, pp. 773–789, "Finite Difference and Wave Number Migration", Dec. 1978.

Primary Examiner—Christine K. Oda
Assistant Examiner—Anthony Jolly
Attorney, Agent, or Firm—Goerge E. Bogatie

[57] ABSTRACT

An improved method for eliminating reflections from artificial model boundaries encountered in finite-difference acoustic wave propagation computations is based on applying two different boundary conditions at the artificial boundary. In this method one boundary condition generates reflections having the same polarity as the incident acoustic wave, and the other boundary condition generates reflections with opposite polarity. To apply the improved method simply compute both boundary conditions on a small narrow region adjacent the artificial boundary on a separate set of grids and average the two solutions.

14 Claims, 5 Drawing Sheets

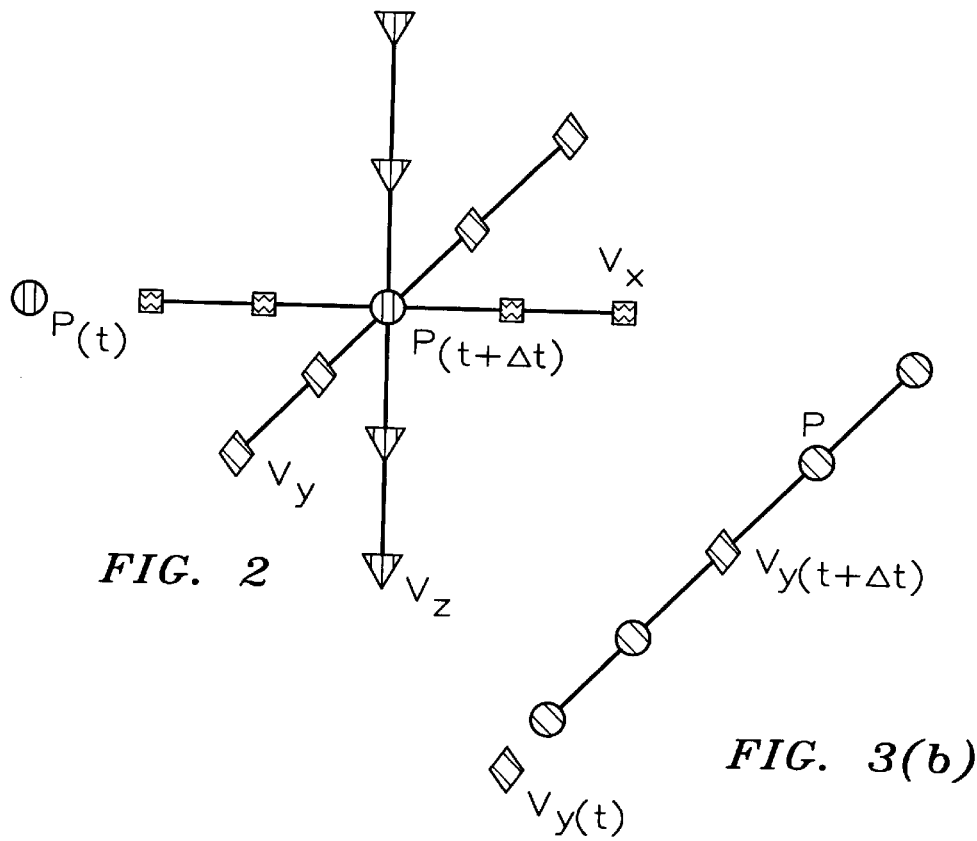
FIG. 2
FIG. 3(b)
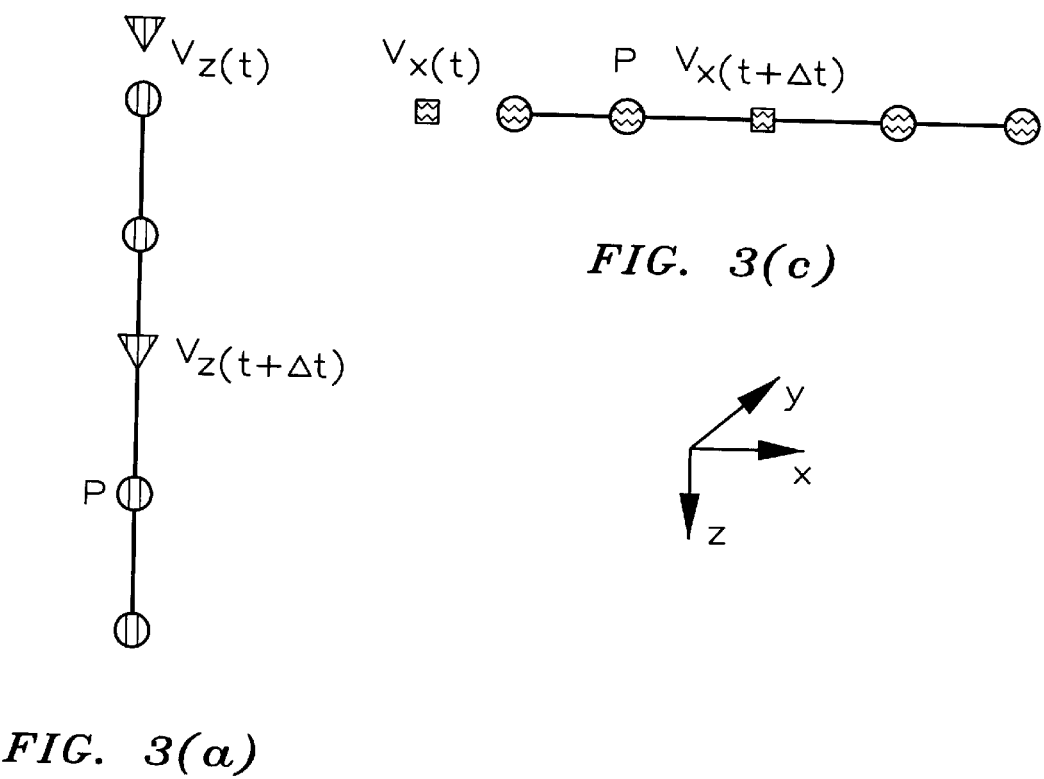
FIG. 3(c)
FIG. 3(a)

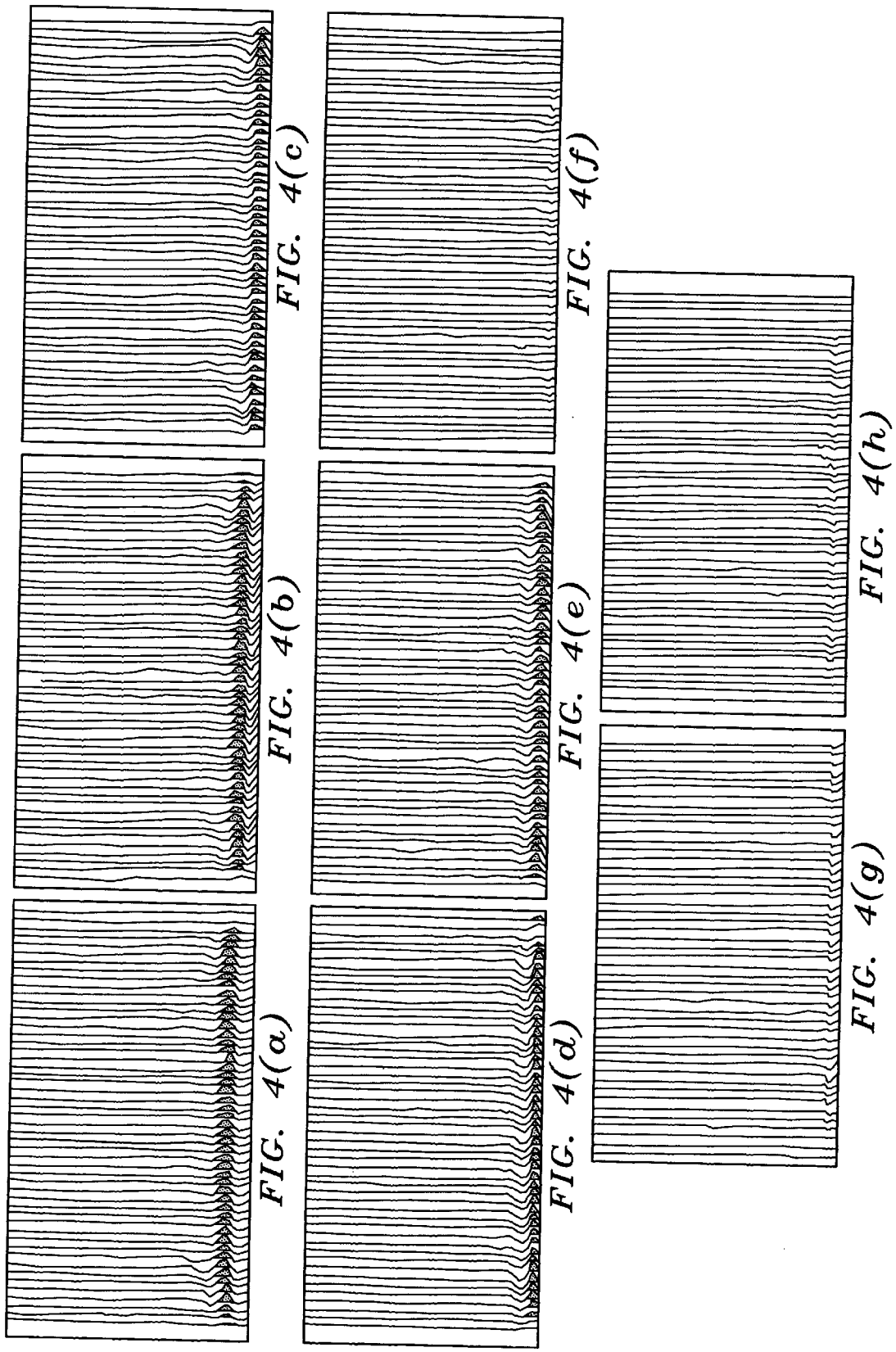

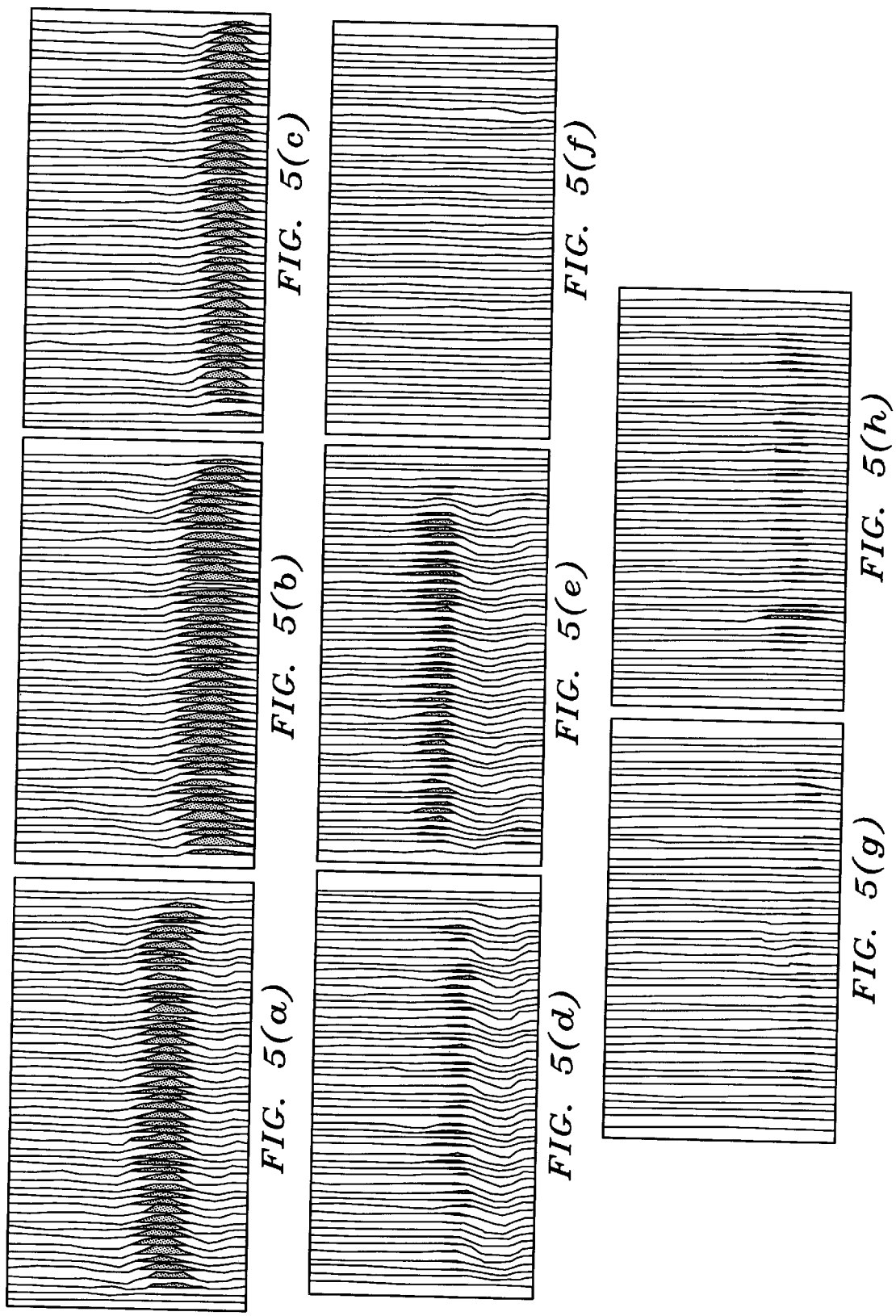

METHOD AND APPARATUS FOR MIGRATION BY FINITE DIFFERENCES

The present invention relates to migration of seismic reflections performed in a high-speed digital computer, and more particularly to modeling and imaging seismic wave propagation in the earth by finite-difference acoustic wave propagation computations.

BACKGROUND OF THE INVENTION

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on a terrain, or another energy source having capacity for delivering a series of impacts or mechanical vibrations to the earth's surface. The acoustic waves generated in the earth by these sources are transmitted back from strata boundaries and reach the surface of the earth at varying intervals of time, depending on the distance and the characteristics of the subsurface traversed. These returning waves are detected by the geophones, which function to transduce such acoustic waves into representative electrical signals. In use an array of geophones is generally laid out along a line to form a series of observation stations within a desired locality, the source injects acoustic signals into the earth, and the detected signals are recorded for later processing using digital computers where the data are generally quantized as digital sample points such that each sample point may be operated on individually. Accordingly, seismic field records are reduced to vertical and horizontal cross sections which approximate subsurface features. The geophone array is then moved along the line to a new position and the process repeated to provide a seismic survey. More recently seismic surveys involve geophones and sources laid out in generally rectangular grids covering an area of interest so as to expand areal coverage and enable construction of three dimensional (3D) views of reflector positions over wide areas.

As oil and gas production from known reservoirs and producing provinces declines, explorationists seek new areas in which to find hydrocarbons. Many of the new areas under exploration contain complex geological structures that are difficult to image with 2D techniques. Accordingly, 3D seismic processing has come into common use for mapping subterranean structures associated with oil and gas accumulations. Geophysics, however, are well aware that a 2D seismic record section or 3D view is not a true reflectivity from the earth, but is instead a transformation of the earth's reflectivity into a plane where each recorded event is located vertically beneath the source/receiver midpoint. Steep dip, curved surfaces, buried foci, faults and other discontinuities in subterranean structure each contribute their unique characteristics to the seismic record and, in complexly faulted and folded areas, make interpretation of the geological layering from the seismic record extremely difficult. Migration is the inverse transformation that carries the plane of recorded events into a true 3D reflectivity of the earth, thereby placing reflections from dipping beds in their correct location and collapsing diffractions.

Of the various available migration methods, wave-equation migration is considered to be superior because it is based on accurate propagation of seismic waves through complex models of the earth. Wave equation computations using numerical techniques have led to a procedure called reverse time migration. By this procedure, the wavefield recorded at the surface is imaged in depth using a model of earth velocities in a numerical solution of the wave-equation. The wavefield at the surface is used as a boundary condition for the numerical computations. Proceeding by inserting the data at the surface of a computational grid for each record time step, starting with the last recorded time sample, and ending with the first, the wavefield migrates to the position from which the reflections originated.

A wave equation model is represented by solutions of the second order partial differential scalar wave equation:

$$\nabla^2 \Phi = \frac{1}{V^2} \frac{\partial^2 \Phi}{\partial t^2} \qquad \text{EQ. (1)}$$

where the $\nabla^2$ operator stands for $$\frac{\partial^2}{\partial x^2} + \frac{\partial^2}{\partial y^2} + \frac{\partial^2}{\partial z^2}$$

V is earth medium velocity, and $\Phi$ is the physical quantity measured: particle velocity, acceleration, displacement or pressure.

The scalar wave equation can also be written as a set of coupled first order partial differential equations:

$$\frac{\partial P}{\partial t} = \rho c^2 \nabla \cdot \vec{U} \qquad \text{EQ. (2)}$$

where $\nabla = \frac{\partial}{\partial x} + \frac{\partial}{\partial y} + \frac{\partial}{\partial x}$ and $\vec{U} = U_x + U_y + U_z$ $$\rho \frac{\partial U_x}{\partial t} = \frac{\partial P}{\partial x} \qquad \text{EQ. (3)}$$

$$\rho \frac{\partial U_y}{\partial t} = \frac{\partial P}{\partial y} \qquad \text{EQ. (4)}$$

and $$\rho \frac{\partial U_z}{\partial t} = \frac{\partial P}{\partial z} \qquad \text{EQ. (5)}$$

Where P is the acoustic pressure, $U$ is the particle displacement velocity, $\rho$ is the density of the medium, and c is the propagation speed of the medium.

A practical procedure for doing reverse time migration (RTM) is disclosed in a publication, Mufti, I. R., et al, "Finite-Difference Depth Migration of Exploration-Scale 3D Seismic Data," Geophysics, Vol. 61. No. 3 (May-June 1996), which is incorporated herein by reference. RTM, which requires enormous computer resources as compared to simpler or less accurate migration algorithms, has recently been applied to 3D seismic data. An improved image results from accuracy (dynamic as well as kinematic) of the finite-difference method over conventional normal-movement and raytracing based seismic imaging methods. In this RTM procedure a finite-difference earth model, which is based on the best estimate of subsurface velocities, is required. This involves dividing the model space into a large number of elementary grid blocks, and assigning a velocity value to each grid.

A common problem with the finite-difference migration method is that simulation of wave propagation in an extensive portion of the earth must be modeled with limited computer resources, i.e., mainly limited central RAM memory in the computer such that artificial boundaries are introduced to limit the computational size of the model. Accordingly, artificial boundaries that act as perfect reflectors are imposed by computer memory limitations, and if not properly handled cause unwanted reflection waveforms. These unwanted reflection waveforms may disrupt the image in complex ways and are not easily removed after the modeling and imaging processes are carried out. In two-dimensional modeling, several approaches have been derived which effectively reduce the amplitudes of these artificial boundary reflections so that they do not cause problems in the region of interest. In 3D simulation, however, the approaches effective in two dimensions are insufficient to reduce boundary reflections to an acceptable level. The basic computing requirements for successful 3D finite-difference acoustic wave equation computations include a large memory and a high-speed processor, however, an urgent need exists for a cost effective and straightforward method to reduce artificial boundary reflections in finite-difference 3D wave equation computations.

Accordingly, an object of the present invention is to eliminate reflections from artificial boundaries in 3D finite-difference acoustic wave equation computations for migration of seismic reflections.

A more specific object is to cancel artificial boundary reflections in computer implemented finite-difference calculations without significantly increasing computer memory capacity and/or computation time.

A still further object of this invention is to produce a computer program which generates high resolution images of seismic wave propagation.

SUMMARY OF THE INVENTION

According to the present invention the foregoing and other objects are attained in a method of finite-difference acoustic wave propagation computations carried out over a large scale earth velocity model. In this method two different boundary conditions are imposed at an artificial boundary, wherein one of the imposed conditions generates reflections having the same polarity as the incident acoustic wave, and the other imposed condition generates reflections with opposite polarity of the incident acoustic wave. A first step of this inventive method involves defining a staggered grid region relative to an elementary grid in the earth velocity model for using EQ. (2) to advance reflected wavefields including a scalar pressure wavefield $P(x,y,z,)$, and a particle velocity vector wavefield $\{V_x(x,y,z,), V_y(x,y,z), V_z(x,y,z,)\}$, wherein the staggered region is much smaller in volume than the interior region of interest in the earth velocity model and is located adjacent to an artificial boundary. Next, applying a boundary condition for solution of the acoustic wave equation of pressure equal zero at the artificial boundary generates the reflected scalar pressure wavefield in-phase with the incident acoustic waves and generates the reflected particle velocity vector wavefield with a polarity reversal. Then, specifying an explicitly reflecting boundary condition of particle velocity equal zero generates the reflected particle velocity vector wavefield in-phase with the incident waves, and the reflected scalar pressure wavefield with a polarity reversal. Finally, averaging the two reflected pressure wavefields and the two reflected particle velocity wavefields over the staggered grid region essentially nulls the reflection from the artificial boundary without suppression of the incident acoustic wave propagation.

In another aspect of the invention, the apparatus comprises a computer programmed to cancel artificial boundary reflections in finite-difference wave propagation computations carried out over a large scale earth velocity model. For large exploration scale 3D field data, the computer is preferably a massively parallel machine.

The method and apparatus of the invention, applying two different boundary conditions at an artificial boundary, one of which causes reflections having the same polarity as in the incident acoustic wave and the other causing reflections with opposite polarity, is the basis for eliminating reflections from artificial boundaries. To apply the method, simply compute both boundary cases in a small region near the boundaries on a separate set of grids and average the two solutions. The method is straightforward and computationally inexpensive to implement since the additional equations are solved only in a region near the boundary, which is small compared to the large interior region of interest. Superior results are attained in this invention compared to conventional methods for suppressing reflections from artificial boundaries because the cancellation method of the invention is effective for all angles of incident waves since it computes the full 3D wavefield (incident and reflected), and selectively suppresses reflections from artificial boundaries.

Still other objects and advantages of the present invention will become readily apparent to those skilled in this art from the following detailed description and the drawings, wherein there is shown and described only one of the several preferred embodiments of the invention. While the best mode contemplated for carrying out the invention is illustrated as applied to migration of seismic reflections, it will be realized that the invention is suitable for other and different embodiments such as applied to forward modeling techniques. Also several details of the invention are capable of modifications in various obvious respects, all without departing from the invention. Accordingly, the description and the drawings are to be regarded as illustrative in nature, and not as restrictive.

BRIEF DESCRIPTION OF THE DRAWINGS

FIG. 2 is a schematic view illustrating a simplified model of a grid for updating advancement of a scalar pressure wave.

FIG. 3(a)–3(c) are schematic views illustrating a simplified model of a grid used for updating advancement of vector particle velocity waves along the x, y and z axes.

FIG. 4(a)–4(h) are a time sequence of seismic records illustrating reflection of an incident seismic wave at an artificial boundary, using the reflecting boundary condition $P(Z=Zmax)=0$.

FIG. 5(a)–5(h) are views similar to FIG. 4 showing the seismic record in greater detail, using the reflecting boundary condition $U_z(Z=Zmax)=0$.

DETAILED DESCRIPTION OF A PREFERRED EMBODIMENT

Figure 1A:
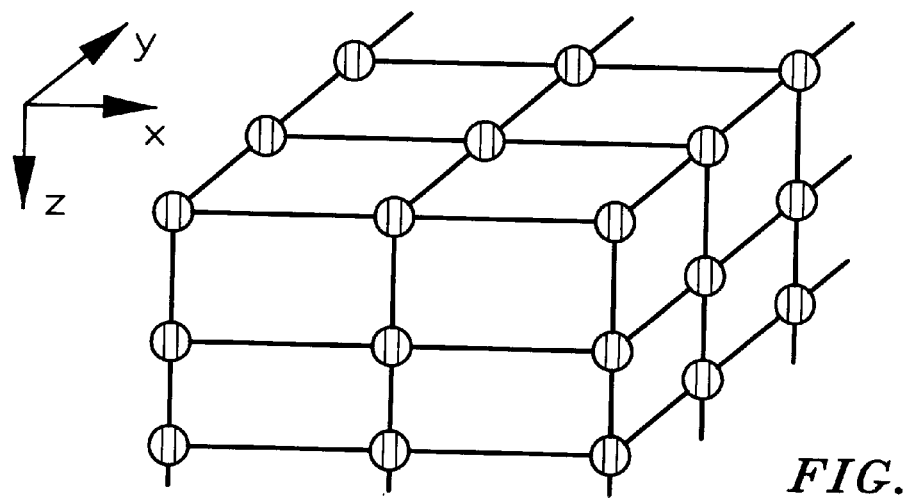
FIG. 1(a) is a perspective view illustrating a grid arrangement, which would be suitable for finite-difference calculations of seismic wave propagation in a large scale earth velocity model.

The basic data to which this invention is applied is in the form of a spatial sequence of unmigrated seismic time scale traces, which have been recorded in a 3D seismic survey, then gathered, digitized and stacked as is known in the art. A first step in processing the real seismic data according to this invention is to set up an earth velocity model for carrying out finite-difference computations for propagation of a wave equation in a high speed or massively parallel computer system such as a CRAY T3E or IBM SP2. The earth velocity model involves setting up computer memory locations for holding values of velocity of the subterranean medium as well as locations for holding values of wavefield parameters such as pressure and particle velocity. FIG. 1(a) illustrates a small section of a typical grid arrangement that can be used for finite-difference wave propagation computations. The simplified illustration of the grid arrangement in FIG. 1(a) uses a circle for the grid locations holding pressure values of a wave and for storage of earth velocities used for wave propagation.

Figure 1B:
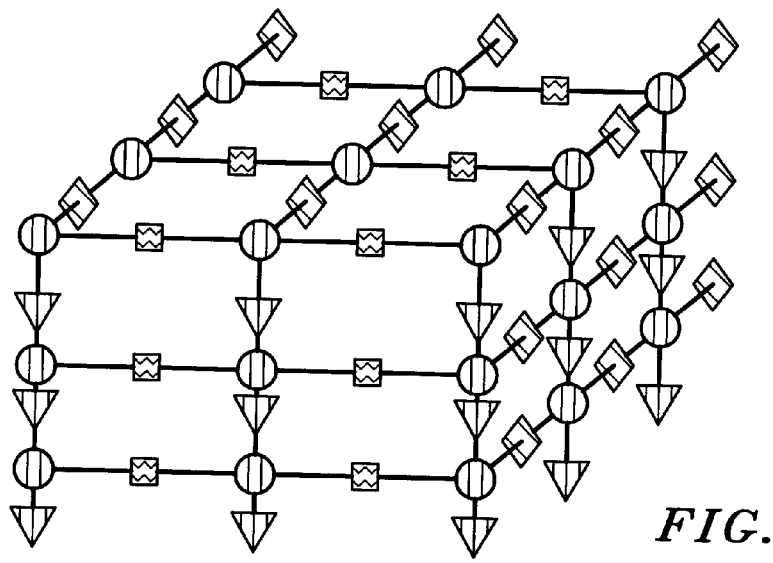
FIG. 1(b) is a perspective view illustrating a staggered-grid arrangement, used for finite-difference calculation in the vicinity of the boundary.

It is realized, however, that seismic wave propagation involves an essentially unlimited extent of the earth while the number of locations used in the velocity model is necessarily limited by the extent of computer memory available. Accordingly, an edge of the limited model acts as an artificial boundary which is a near-perfect reflector. According to the invention, the finite-difference model includes two regions each having its own arrangement of grids, both of which arrangements, however, have the cubical arrangement shown in FIG. 1(a) and 1(b). FIG. 2 depicts a staggered-grid arrangement, which uses a circle for the grid locations holding pressure valves of a wave, while triangles hold the z-component, squares hold the x-component and diamonds hold the y-component of particle velocity for the wave. Accordingly, it is straightforward to connect the acoustic wave equation EQ.(1) to EQ.(2)–(5) between grids in the two regions. For a discussion of determining grid spacing as well as time sampling intervals refer to the publication of Mufti et al., previously incorporated by reference. Accordingly, the region near the boundary is herein referred to as a staggered grid region with reference to the interior region of the velocity model. In effect the staggered grid region can be considered a separate subset of grids over which appropriate finite-difference wave equation computations essentially eliminate reflections from an artificial boundary without interfering with the incident wave, as will be more fully explained hereinbelow.

Referring now to FIG. 2, wherein the symbols including the circle, the square, the triangle and the diamond shape have the same meaning as in FIG. 1, a computational model for advancing a scalar pressure wave through an individual grid is illustrated. According to the model in FIG.2, four velocity values are required in each of the X, Y and Z axes to advance the pressure wave at P(t) to a position P(t+Δt). In a similar manner FIGS. 3(a)–3(c) illustrate advancement of a vector particle velocity wave through an individual grid, where wavefield pressure values are required in each axis to advance the particle velocity wave from V(t) to V(t+Δt) in each of the three axes. FIGS. 4(a)–4(h) illustrate a time history of the evolution process of the pressure wavefield for eight consecutive time steps that include a reflection from the bottom artificial boundary, and a cancellation step. FIGS. 4(a)–4(c) show advancement of the downward propagating plane wave, and FIGS 4(d)–4(e) show the reflection off of the bottom boundary, with no polarity reversal, since the pressure equal zero artificial boundary condition is applied. Between FIGS. 4(e) and 4(f), cancellation is applied, which causes the reflection energy in the staggered grid region to disappear before it can propagate into the interior of the velocity model. FIGS. 4(f)–4(h) illustrate three time steps in which the next reflection is beginning to grow at the boundary in preparation for the next cancellation step.

FIGS. 5(a)–5(h) shows the same eight time images for the case of velocity equal zero boundary condition applied at the bottom boundary. This figure is zoomed in on the bottom one-third of those shown in FIG. 4. Here it is noticed at FIG. 5(d) a polarity reversal occurs after reflection from the bottom artificial boundary. In FIGS. 5(d)–5(e) a trough (i.e., trace values deflecting to the left), in the region, where a peak (i.e., trace values deflecting to the right) occurs in corresponding time steps 4(d)–4(e). Accordingly between corresponding time steps (e) and (f) the wavefield in FIG. 5 is averaged with the wavefield in FIG. 4 to cancel the reflected energy.

In the finite-difference computations seismic wave propagation in the interior of the velocity model is assumed to be governed only by the second order partial differential equation referred to as EQ.(1) above. Solution of this EQ.(1) by numerical means is known in the art, and a practical solution is illustrated in the previously incorporated reference publication by Mufti, et al. As previously mentioned in the staggered grid region, two boundary conditions are applied, and two separate solutions in the staggered grid region are allowed to evolve. Then the two solutions are averaged at a predetermined time interval which allows sufficient evolution time of the reflected wave for the cancellation technique to be effective, but is short enough so that the reflected wavefronts do not propagate back into the interior region of the velocity model. In the staggered grid region finite-difference computation of the seismic wave propagation is assumed to be governed by four first order partial differential equations given by EQ. (2)–EQ. (5).

Figure 6:
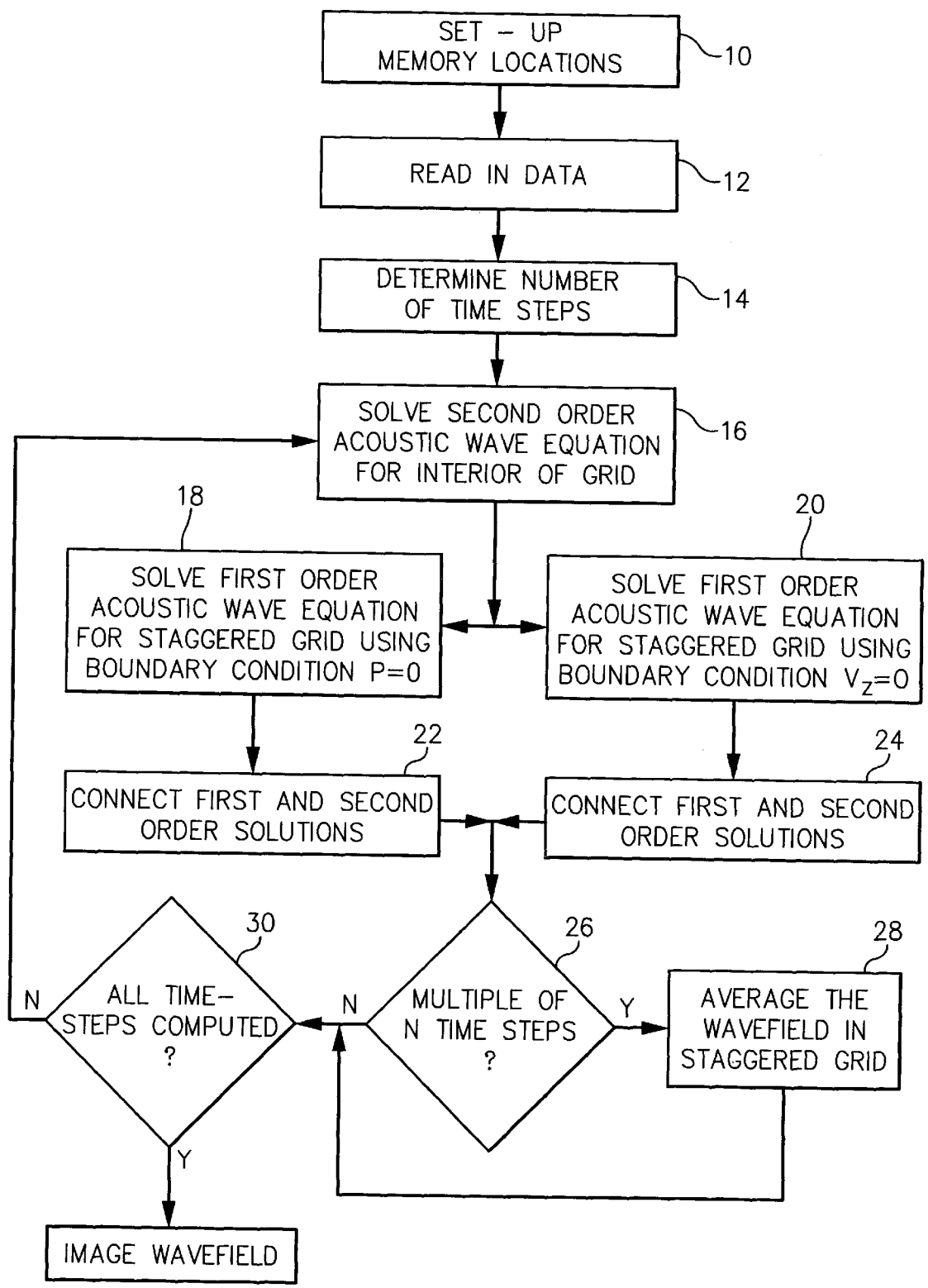
FIG. 6 is a flow chart describing computer programming for canceling artificial boundary reflections according to this invention.

FIG. 6 shows a flow chart of typical processing steps employed in practice of this invention which cancels seismic wave reflections from artificial boundaries. One starts with setting up computer memory locations as illustrated at 10. The memory locations are for finite-difference computational grids, which include locations (as illustrated in FIGS. 1, 2 and 3) for holding velocities values of the medium as well as wavefield values for pressure. The physical space representation of the grid is as shown in FIG. 1(a). In step 12 input data is read in. This input data includes the best available values for wave velocity in the medium, and also wavefield values, which are real seismic data that is used in the computational grids. In step 14 the number of time intervals N to allow enough time for wave propagation to evolve between time steps for essentially canceling the reflected wave is computed according to the equation:

$$N=(3/4)Z/V\text{max}*\Delta t$$

where; Z is the width of the staggered grid region adjacent to the artificial boundary, V is the maximum velocity associated with the grid, and Δt is the time step employed. Step 16 refers to the usual solution of second order partial differential equations EQ. (1). The procedure then divides into two parallel paths, with block 18 referring to the solution of four first-order partial differential equations EQ. (2), EQ.(3), EQ.(4) and EQ. (5) in the staggered grid region using a boundary condition of pressure equal zero. In block 20, EQ.'s (2) through EQ.(5) are again solved in the staggered grid region using a boundary condition of particle velocity equal to zero. The procedure then advances to parallel arranged blocks 22 and 24 where wavefield values from the solution of the second order partial differential equation in the interior region of the model are inserted at the interior boundary of the staggered grid region to connect wave equation solutions in the two regions. Step 26 determines if enough time steps have elapsed for the cancellation of reflected waves to be effective, and if so the cancellation technique is applied in step 28 by averaging the appropriate wavefields. Step 30 determines if all time steps have been finished.

In this disclosure, there is shown and described only the preferred embodiment of the invention, but, as aforementioned, it is to be understood that the invention if capable of use in various other combinations and environments and if capable of changes or modifications within the scope of the inventive concept as expressed herein.

That which is claimed is:

1. A computer implemented method for canceling reflections from an artificial boundary when computing propagation of an advancing acoustic wave over a large scale earth velocity model limited by said artificial boundary, wherein space in said velocity model is divided into a large number of elementary grid blocks, said method comprising:

(a) defining a staggered grid region within said large scale velocity model for computing propagation of a plurality of wavefields, wherein said plurality of wavefields includes a reflected scalar pressure wavefield, and a reflected vector particle velocity wavefield;

(b) wherein said staggered grid region is located adjacent to said artificial boundary, and is much smaller compared to the interior of said velocity model;

(c) applying a first boundary condition of pressure equal zero at said artificial boundary for solution of an acoustic wave equation, thereby generating said reflected scalar pressure wavefield in-phase with said advancing acoustic wave and said reflected vector particle velocity wavefield out-of-phase with said advancing acoustic wave;

(d) applying a second boundary condition of particle velocity equal zero at said artificial boundary for solution of said acoustic wave equation, thereby generating said reflected scalar pressure wavefield out-of-phase with said advancing acoustic wave and said reflected vector particle velocity wavefield in-phase with said advancing acoustic wave; and (e) averaging said reflected pressure wavefield, and averaging said vector particle velocity wavefield generated in steps (c) and (d) over said staggered grid region to essentially cancel reflections from said artificial boundary.

2. A method in accordance with claim 1, wherein solution of said wave equation is carried out using numerical finite-difference techniques, and wherein computations are reverse time migration computations with observed data propagated backward in time.

3. A method in accordance with claim 1, wherein simulation of said advancing acoustic wave in said velocity model is based on actual seismic data recorded in a 3D seismic survey.

4. A method in accordance with claim 1, wherein said elementary grid blocks are established in computer memory locations for advancing instantaneous pressure values for said acoustic wave, and also for storing predefined values of acoustic velocity in the earth.

5. A method in accordance with claim 1, wherein space in said staggered grid region is divided into a large number of staggered grid blocks defined in computer memory locations and the number of staggered grid blocks in said staggered region normal to said artificial boundary is a number effective for essentially canceling reflections from said artificial boundary.

6. A method in accordance with claim 5, wherein wave propagation in said elementary grid blocks is governed by a second order partial differential equation, and wherein wave propagation in said staggered grid blocks is governed by a set of four coupled first order partial differential equations.

7. A method in accordance with claim 6, wherein said staggered grid blocks are coupled to said elementary grid blocks by inserting wavefield values from said second order partial differential equation computed over said elementary grid blocks into memory locations of said staggered grid blocks in the interior portion of said staggered grid region.

8. A method in accordance with claim 1 additionally comprising imaging said advancing acoustic wave and wave reflections from said artificial boundary.

9. Apparatus for canceling reflections from an artificial boundary when computing propagation of an advancing acoustic wave over a large scale earth velocity model, wherein space in said velocity model is divided into a large number of elementary grid blocks, said apparatus comprising:

a computer programmed for:
   i) storing said large scale earth velocity model in a computer memory, wherein said earth velocity model includes a staggered grid region, and wherein said staggered grid region is effective for computing propagation of a plurality of reflected wavefields including a reflected scalar pressure wavefield, and a reflected vector particle velocity wavefield;

(ii) applying a first boundary condition of pressure equal zero at said artificial boundary for solution of an acoustic wave equation, thereby generating said reflected scalar pressure wavefield in-phase with said advancing acoustic wave, and said reflected vector particle velocity wavefield out-of-phase with said advancing acoustic wave;

(iii) applying a boundary condition of particle velocity equal zero at said artificial boundary for solution of said acoustic wave equation, thereby generating said reflected scalar pressure wavefield out-of-phase with said advancing acoustic wave, and said reflected vector particle velocity wavefield in-phase with said advancing acoustic wave and (iv) averaging said reflected pressure wavefields and averaging said particle velocity wavefields generated in steps (ii) and (iii) over said staggered grid region to essentially cancel reflections from said artificial boundary.

10. Apparatus in accordance with claim 9, wherein said computer is additionally programmed to solve said wave equation using numerical finite difference computations, wherein computations are reverse time migration computations with observed data propagated backward in time.

11. Apparatus in accordance with claim 9, wherein memory in said computer containing said large scale velocity model includes memory locations for storing velocity values for earth waves, and for holding pressure values for an advancing earth wave.

12. A program storage device, readable by a computer, tangibly embodying a program of instructions executable by said computer to perform method steps for canceling reflections from an artificial boundary when computing propagation of an advancing acoustic wave over a large scale earth velocity model in said computer, wherein said velocity model is limited by said artificial boundary, and wherein space in said velocity model is divided into a large number of elementary grid blocks, said method comprising:

(a) defining a staggered grid region within said large scale velocity model for computing propagation of a plurality of wavefields, wherein said plurality of wavefields includes a reflected scalar pressure wavefield, and a reflected vector particle velocity wavefield;

(b) wherein said staggered grid region is located adjacent to said artificial boundary, and is much smaller compared to the interior of said velocity model;

(c) applying a first boundary condition of pressure equal zero at said artificial boundary for solution of an acoustic wave equation, thereby generating said reflected scalar pressure wavefield in-phase with said advancing acoustic wave and said reflected vector particle velocity wavefield out-of-phase with said advancing acoustic wave;

(d) applying a second boundary condition of particle velocity equal zero at said artificial boundary for solution of said acoustic wave equation, thereby generating said reflected scalar pressure wavefield out-of-phase with said advancing acoustic wave and said reflected vector particle velocity wavefield in-phase with said advancing acoustic wave; and (e) averaging said reflected pressure wavefield, and averaging said vector particle velocity wavefield generated in steps (c) and (d) over said staggered grid region to essentially cancel reflections from said artificial boundary.

13. A method in accordance with claim 12, wherein solution of said wave equation is carried out using numerical finite-difference techniques, and wherein computations are reverse time migration computations with observed data propagated backward in time.

14. A method in accordance with claim 12, wherein simulation of said advancing acoustic wave in said velocity model is based on actual seismic data recorded in a 3D seismic survey.

* * * * *